Patented Dec. 27, 1938

2,141,928

UNITED STATES PATENT OFFICE 2,141,928

WELDING FLUX

March Rudolph Moritz, Sale Moor, and Ian Claude Fitch, Forest Hill, London, England, assignors to General Electric Company, a corporation of New York No Drawing. Application December 14, 1936, Serial No. 115,884. In Great Britain January 8, 1936

3 Claims. (Cl. 219—8)

Our invention relates to welding fluxes and more particularly to flux-coated metallic arc welding electrodes.

In metallic arc welding the weld is produced through the agency of an arc established between the work and a metal rod or pencil commonly referred to as an electrode. By associating certain materials with the electrode, the operating characteristics of the arc during welding and the quality of the weld metal deposited are greatly improved. Such materials are referred to as fluxes.

It is an object of our invention to provide an improved arc welding flux.

It is a further object of our invention to provide small gauge, flux-coated metal electrodes suitable for welding thin plates and similar articles.

Further objects of our invention will become apparent from a consideration of the following description thereof.

It is especially desirable in fine gauge welding that the flux coating should have a protective and localizing effect on the arc and that the resultant slags should be readily controllable during the welding process.

We accomplish these results by employing a flux of substantially the following composition by weight:

| | Percent |
|---|---|
| Iron oxide | 60 to 70 |
| Feldspar | 15 to 25 |
| Talc | 5 to 15 |
| Sodium carbonate (on the basis of the anhydrous form) | Up to 7 |

The iron oxide content of the mixture may be present as ferrous oxide or as a mixture of ferrous and ferric oxides. The feldspar is preferably orthoclase. The sodium carbonate may be present in the mixture either in the anhydrous form or in the hydrated form.

The above specified ingredients within the range of proportions specified are mixed as powders and when applied to electrodes are made into a paste by the addition thereto of suitable fluid adhesives or by the addition of fluids together with adhesives, the consistency of the resulting paste being regulated as desired.

By varying the proportions of the constituent materials within the ranges specified, the welding behavior of the resultant flux material may be varied. For example, electrodes coated with flux mixtures in which the talc content is of the order of 15% by weight are found to be more suitable for vertical and overhead welding.

A preferred flux coating rendering electrodes suitable for general purposes may have the following composition by weight:

| | Percent |
|---|---|
| Ferric oxide | 64.5 |
| Orthoclase feldspar | 22.6 |
| Talc | 8.7 |
| Sodium carbonate—anhydrous, (but preferably used in the hydrated form) | 4.2 | with enough sodium silicate solution to provide a paste of suitable consistency.

The flux may be applied to the electrode wire or rod by a process of extrusion or by dipping the wire or rod into a pasty or semi-fluid flux mass having the desired consistency. For coated electrodes particularly suitable for fine gauge welding when the wire or rod size is not greater than .10″ in diameter, the thickness of the flux covering is preferably such that the outside diameter of the covered electrode is about 1.6 times that of the bare electrode.

The electrode wire or rod may have the following composition by weight:

| | |
|---|---|
| Carbon | .06 to .13 |
| Manganese | .3 to .6 |
| Silicon | Not more than .04 |
| Sulphur | Not more than .04 |
| Phosphorous | Not more than .04 |
| Iron | The remainder |

The electrode may be used with either alternating or direct current sources of welding current. When using a direct current source the electrode should preferably be connected to the positive terminal thereof, but good results are also obtained when using negative polarity on the electrode. The actual current value is governed by the particular class of work to be welded and should in all cases be kept as high as possible without burning through the parts to be welded.

The welding speed should be as fast as possible, using a rather short arc. It is best to use no oscillation of the electrode when welding. The best welding position for horizontally disposed work is with the electrode tilted, in the direction of travel, about 10° to 20° from the vertical through the point of welding. In vertical welding best results are obtained by traveling upward.

The heavy and voluminous slag produced during welding affords ample protection for the weld metal from atmospheric gases. It also has the property of insuring an even and smooth flow of the deposited metal. The burning of the parts to be welded by the arc is prevented by the rapid cooling action of the slag which, in spite of its bulk, does not interfere with the operation of the electrode and always leaves the arc pool clearly visible.

Electrodes of heavy rod or core sizes in S. W. gauges from 14 to 22 are particularly suited for welding thin plates up to about 1/16 inch in thickness. Such electrodes may also be used to advantage for building up light drums and sheet metal work generally, such as radiators, lagging and other constructions of thin materials where a good finish is required.

What we claim as new and desire to secure by Letters Patent of the United States is:

1. A flux for use in arc welding having substantially the following composition by weight:

| | Percent |
|---|---|
| Iron oxide | 60 to 70 |
| Feldspar | 15 to 25 |
| Talc | 5 to 15 |
| Sodium carbonate (on the basis of the anhydrous form) | Up to 7 |

2. An arc welding electrode having a flux coating of substantially the following composition by weight:

| | Percent |
|---|---|
| Iron oxide | 60 to 70 |
| Feldspar | 15 to 25 |
| Talc | 5 to 15 |
| Sodium carbonate (on the basis of the anhydrous form) | Up to 7 | and a binder.

3. An arc welding electrode having a coating of substantially the following composition by weight:

| | Percent |
|---|---|
| Ferric oxide | 64.5 |
| Orthoclase | 22.6 |
| Talc | 8.7 |
| Sodium carbonate (on the basis of the anhydrous form) | 4.2 | and a binder.

MARCH RUDOLPH MORITZ.
IAN CLAUDE FITCH.